Jan. 21, 1969 W. A. JANSON 3,422,602
GAS FILTER STRUCTURE
Filed Feb. 27, 1967 Sheet 1 of 3
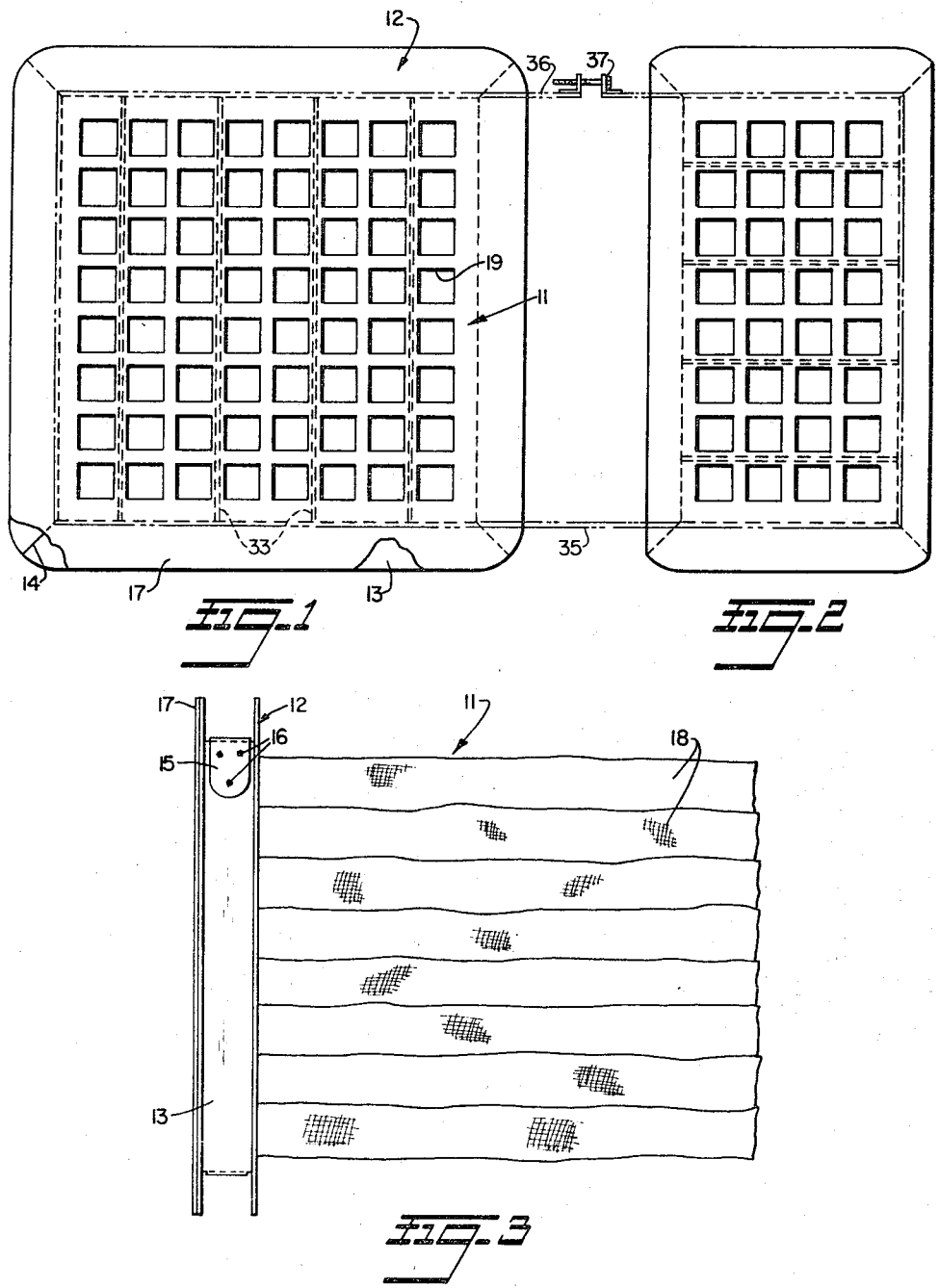
INVENTOR
WILLIAM A. JANSON
BY Strauch, Nolan, Neale, Nies & Kurz
ATTORNEYS

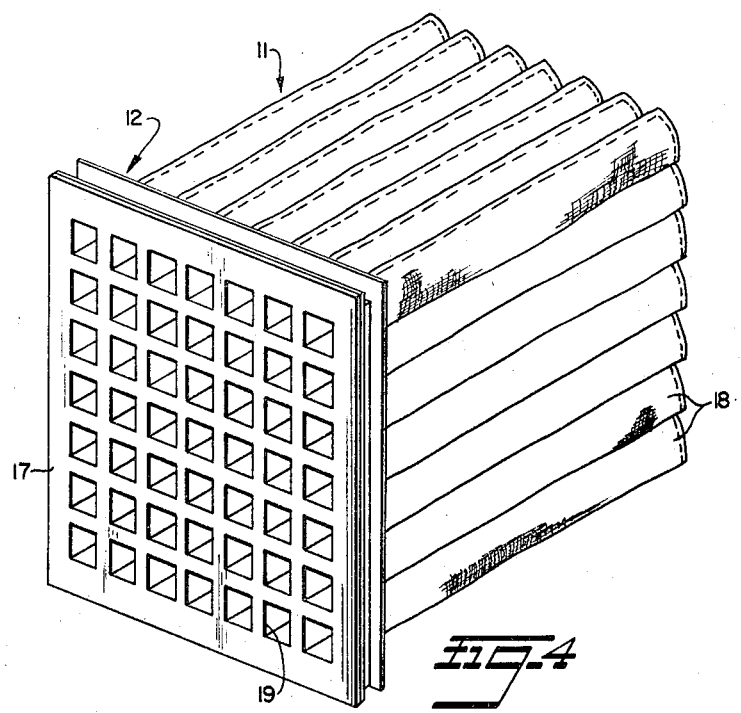
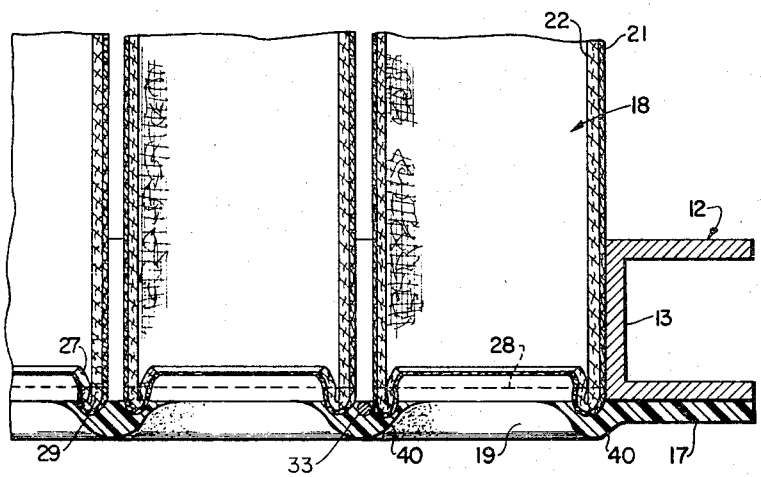

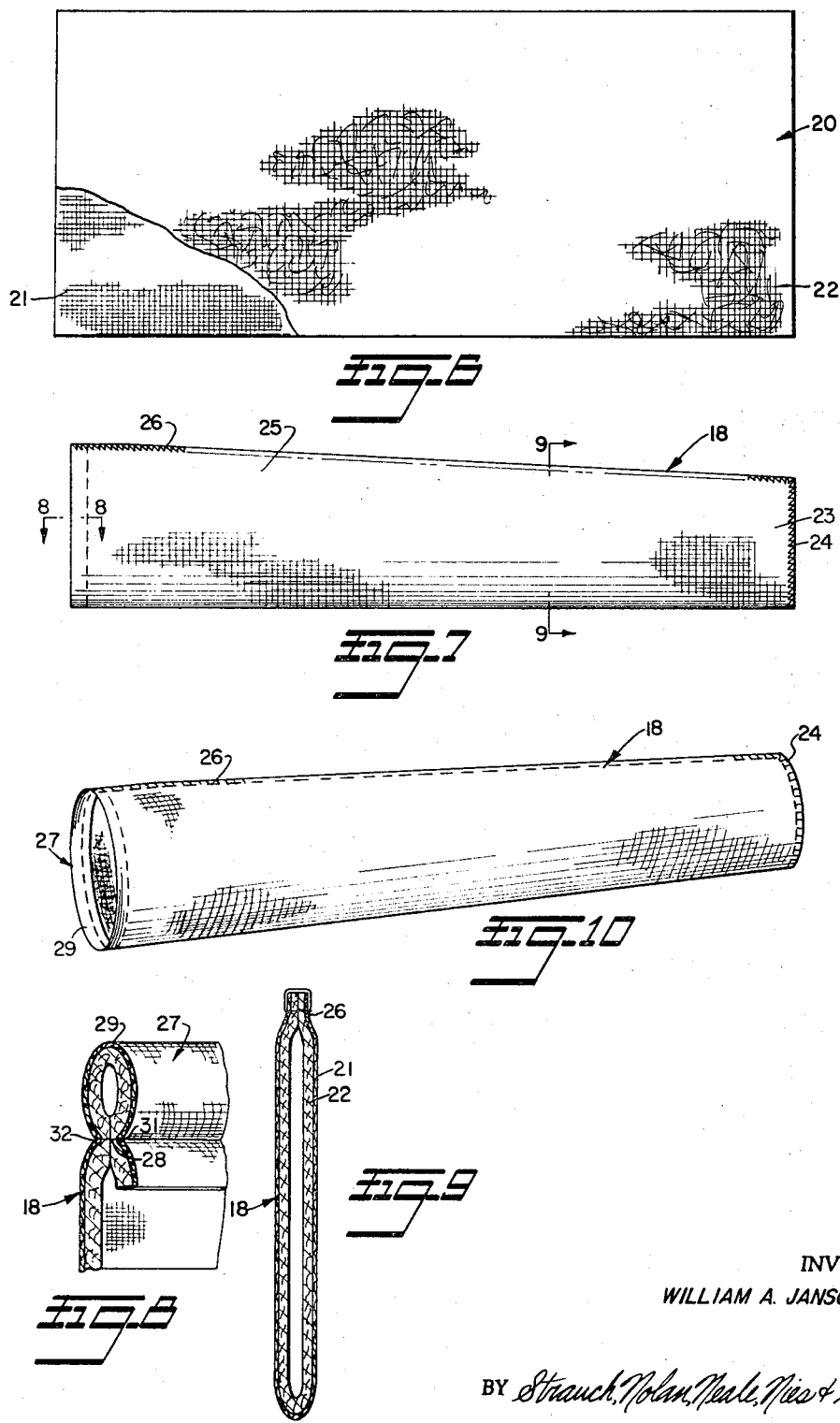

United States Patent Office 3,422,602
Patented Jan. 21, 1969

3,422,602
GAS FILTER STRUCTURE
William A. Janson, Pepper Pike, Ohio, assignor to North-American Rockwell Corporation
Filed Feb. 27, 1967, Ser. No. 618,613
U.S. Cl. 55—378        4 Claims
Int. Cl. B01d 29/24

ABSTRACT OF THE DISCLOSURE

An air or like gas cleaning filter assembly wherein the open ends of a plurality of relatively long flexible filter bag elements, variously known as pockets or socks, are permanently embedded as by molding in a relatively rigid apertured nonmetallic plastic front panel bonded to a rigid metal frame by which it is adapted to be mounted like a grating in the path of air flow. The apertured panel is formed and bonded to the mounting frame and the ends of elements incorporated therein in a single molding operation.

RELATED APPLICATION

The method of incorporating the filter elements in the assembly is disclosed and claimed in the related application of Jacob K. Brixius and James R. Ryan, Ser. No. 622,977, entitled "Method of Making Filter Assemblies," and filed Mar. 14, 1967, and owned by applicant's assignee.

BACKGROUND OF INVENTION

Field of invention

This invention relates to air or like gas cleaning filter assemblies of the type wherein a plurality of elongated tubular flexible filter bags herein mainly referred to as socks or pockets have their open ends permanently attached to a grating-like apertured panel. Due to the length of these socks or pockets which in operation are expanded by air pressure and extend rearwardly away from the panel in the direction of air flow, a considerably increased filter area is provided for any given panel area in contrast to conventional flat filters which have the same area as the panel. Filter assemblies of this general type are disclosed in the U.S. Letters Patent to Rivers, No. 2,853,154, and Hogg, No. 3,124,440, and related filter assemblies are disclosed in U.S. Letters Patents to Birkholz, No. 1,821,202, and Slayter, No. 2,774,443.

Prior art

Prior to the invention these filter elements were mechanically attached as by clamps, fasteners, adhesive and even supporting frames to separately constructed apertured panel structures. This was mainly objectionable in that the structures were sometimes complex, considerable expensive labor was involved in assembly and leakage was a problem unless adequate sealing was provided. The above-identified patents are representative of known prior art.

SUMMARY OF INVENTION

The invention comprises a novel filter structure wherein a bank of flexible tubular filter elements have their open ends permanently attached to an apertured front panel, and preferably wherein the panel is a molded grating-like structure having the filter element ends embedded in the panel material at the air admission apertures. This provides a secure anchor and an air-tight mounting for the filter elements. The invention may be applied to filters wherein an individual filter element is secured over each panel opening, or to filters like those of said Hogg patent where adjacent filter elements are intergral and longitudinally attached by seams to each other.

It is the major object of the invention to provide a novel filter assembly of the so-called extended area type wherein the open ends of elongated flexible tubular filter elements are permanently united as by molding with a correspondingly apertured front panel. In furtherance of this object, this invention contemplates bonding the panel to a rigid mounting frame, preferably by molding.

The novel features of the present invention will now be described in detail in the following description by having reference to the accompanying drawings in which:

FIGURE 1 is a front view of a filter panel assembly constructed according to the present invention;

FIGURE 2 is a view similar to FIGURE 1 which illustrates a size modification of the filter panel in FIGURE 1;

FIGURE 3 is a side view of the filter panel in FIGURE 1 showing the pockets or socks extended at full length for illustrating purposes;

FIGURE 4 is a perspective view of the present novel filter panel assembly;

FIGURE 5 is an enlarged cross section through the novel filter sock;

FIGURES 6 through 10 illustrate the structure and manufacture of each individual sock of the assembly of FIGURES 1 through 5 inclusive.

PREFERRED EMBODIMENTS

FIGURE 1 shows the filter assembly comprising a front panel 11 having a rectangular border frame 12 made by rigidly securing together four straight similar channel elements 13, usually of light sheet metal. Elements 13 have their ends cut at an angle at 14 to fit together at the corners. The channels all open outwardly so that a continuous channel is formed all around the frame for mounting purposes. At each corner a tab 15 integral or rigid with one element 13 is bent over the adjacent element and fixed thereto as by spot welding at 16.

Panel 11 also comprises an apertured forward panel section 17 which in the preferred embodiment of the invention is a nonmetallic solid plastic member that is formed by molding during an operation which bonds it to frame 12 and embeds therein the open ends of a plurality of rearwardly extending tubular filter elements or socks 18. The molded panel section 17 is illustrated as formed with rectangular openings 19 of the same size, but other shapes may be used.

FIGURES 6–10 illustrate the structure and manufacture of each sock 18 prior to mounting the open front each on panel section 17.

A sheet 20 of laminated fabric 21 and filter material 22 is cut to size. The fabric may be buckram, scrim or any like tough porous material. The filter material is preferably a layer of glass fibre or like fire resistance material. The laminated sheet is flexible, and is folded over on its longitudinal centerline with material 22 inside. One end 23 is closed as by stitching indicated at 24, and the overlapping side edges at 25 are stitched together at 26. FIGURES 8 and 9 illustrate the nature of the stitching and it will be seen that the fiber glass layer 22 is compressed together by the tight stitches so that the seams are substantially air-tight.

At the other end of the sock, which is to be the open end, a short length of the laminated sheet is turned in to form an internal cuff 27 which is stitched in place as at 28. Cuff 27 thus forms a substantially annular bead 29 around the open end of the sock. It will be noted that the stitching 28 results in annular indented grooves 31 and 32 on both the interior and exterior of the cuff.

Instead of stitching the edges of the folded sheet of filter media, the edges may be glued or heat sealed together. Also the blank sheet of filter media may be cut in such way that when stitched or glued together the sides of the filter elements will be slightly tapered down towards the rear ends to eliminate possible interference between adjoining filter elements when in operation and thus prevent undesired reduction in effective filter area.

Referring to FIGURE 5, the open ends of individual socks 18 are incorporated by molding to panel section 17. This is done by providing a mold of the required depth and having projections corresponding in number, size and spacing to apertures 19. The open ends of socks 18 are aligned with the mold projections and suitably supported in the mold, and frame 12 is seated in the mold surrounding the array of socks at their inner ends. Then a quantity of fusible fluid plastic such as a thermosetting liquid resin is poured into the mold until it rises to a level sufficient to surround part of the bead 29 of each sock. Then the plastic is heated and allowed to cure and in hardening it forms the solid unitary panel section 17 according to the mold shape and bonds that panel section to frame 12 and to the open inner ends of all socks 18. After the plastic has hardened and the parts are all anchored together, the mold is separated from the now integral bonded filter assembly.

Preferably a suitable adhesive or primer substance is coated over the front surface of frame 12 before the molding operation, and this insures a good bond between panel 17 and frame 12. In some instances the panel may be anchored by providing holes in the front side of the frame 12 to receive interlocking plastic extensions during molding.

A suitable plastic found acceptable for purposes of the invention is a polyvinyl chloride resin dispersed in a liquid plasticizer and commercially known as Plastisol. This material is readily pourable and when the mold temperature is raised to about 350°–400° F. it cures to a relatively stiff but elastomeric solid state which is resistant to chemicals and high temperatures.

Panel 17 may advantageously be formed of any suitable castable plastic resin, cured by heat or at room temperature.

The cured resin forms panel section 17 permanently bonded to and bridging frame 12, and the open ends of filter elements 18 are embedded in the panel section.

If desired a series of transverse rigid reinforcing metal bars 33 may be provided across the frame 12 prior to molding, and these bars will become embedded in panel section 17.

In the filter assembly the filter elements 18 are arranged in uniform spacing in aligned vertical and horizontal rows. The rear portions of the filter elements are unsupported and extend rearwardly away from the panel. These unsupported filter portions may be collapsed and folded over against the rear of the panel for providing a substantially flat package which facilitates storage, handling and shipping. In use, upon installation of the filter in a suitable ventilating or air conditioning system with the free ends of the filters extending in the direction of the air stream away from the panel the force of the air flow expands the pockets to their full length into a substantially straight horizontal position as shown in FIGURES 3 and 4. The individual filter elements are so shaped and spaced that when they are fully extended and inflated they do not interfere with each other, to thus minimize operating resistance.

Due to the varying size requirements in air conditioning systems and the like, several panels may be assembled together side by side in a bank. This may be accomplished by placing the two panels side by side and strapping a metal band 35 around their channeled peripheries. The ends of the band 36 are then tightly secured together by a screw clamp 37. The abutting edges of the two panels may be sealed with a suitable sealing compound to prevent air leakage through that space.

The mold is preferably designed such as to shape smooth radii around the edges of the air admission openings as indicated at 40 in FIGURE 5 such as to further enhance air flow capabilities by eliminating any sharp corners and providing a streamlined air entrance.

Simultaneously with connecting and supporting the filter elements 18, the molded anchor connection provides an effective seal around the attached edges of the filter elements. This prevents unfiltered air from bypassing the filter elements and causes the air to enter the filter elements 18 only through openings 19.

In the invention various panels may be color-coded by adding the respective coloring to the resin compound to thereby identify filters of different efficiency ranges instead of having to mark the panels by some other means which would require additional manufacturing time.

When the filter assembly is mounted in a wall aperture or the like the relatively soft elastomeric flat front surface around the periphery of panel 17 provides air tight sealing engagement with a mounting frame at the aperture, in this respect functioning as a gasket. A Plastisol of medium softness, about 75 durometer A scale gives a good seal while at the same time providing an adequately rigid panel 17.

I claim:

1. A filter assembly for air and other gases comprising a rigid metal mounting frame defining an opening of substantial size, a unitary plastic plate molded to said frame and bridging said opening, said plastic plate forming a plurality of uniformly distributed air admission openings, each bounded by ridges of substantial thickness, and a corresponding plurality of elongated flexible filter bags, each bag having an open end bounded by a cuff, each said cuff being permanently molded into the ridges forming one of said air admission openings, and all of the ridges except those adjacent to said frame being of sufficient width to accommodate portions of the cuffs of two adjacent filter bags and to seal the space between them.

2. The filter assembly as defined in claim 1 wherein said plastic plate is an elastomeric unit.

3. The filter assembly according to claim 1 together with rigid reinforcing members extending across said opening and joined to said metal frame and embedded within certain of said ridges.

4. the filter assembly according to claim 1 wherein said filter bags each comprise a collapsible fabric tube having a bonded fiber glass lining.

References Cited

UNITED STATES PATENTS

| | | |
|---|---|---|
| 2,062,649 | 12/1936 | Hegan. |
| 2,143,664 | 1/1939 | Synder. |
| 2,208,135 | 7/1940 | McCormick et al. ____ 210—323 |
| 2,754,972 | 7/1956 | McCann. |
| 2,853,154 | 9/1958 | Rivers _____ 55—376 X |
| 2,907,406 | 10/1959 | Bader et al. _____ 55—341 X |
| 2,941,620 | 6/1960 | Thornburgh. |
| 3,067,504 | 12/1962 | Lubben et al. |
| 3,100,190 | 8/1963 | Hobson. |
| 3,124,440 | 3/1964 | Hogg _____ 55—484 |
| 3,124,441 | 3/1964 | Rivers _____ 55—500 |
| 3,177,636 | 4/1965 | Jensen _____ 55—341 |
| 3,208,205 | 9/1965 | Harms et al. _____ 55—500 X |
| 3,217,472 | 11/1965 | Babbitt et al. _____ 55—511 X |
| 3,237,775 | 3/1966 | Porter et al. _____ 210—323 |
| 3,249,228 | 5/1966 | Arvanitakis. |
| 3,256,996 | 6/1966 | Porter et al. _____ 210—457 |
| 3,276,190 | 10/1966 | Babbitt et al. _____ 55—341 |
| 3,261,148 | 7/1966 | Wurtenberg _____ 55—341 |

FOREIGN PATENTS 750,099    6/1956    Great Britain.

HARRY B. THORNTON, Primary Examiner.

DENNIS E. TALBERT, Assistant Examiner.

U.S. Cl. X.R.

55—381, 484, 486, 500, 502, 511; 150—1; 210—493